US009467045B2

(12) United States Patent
Fogg et al.

(10) Patent No.: US 9,467,045 B2
(45) Date of Patent: Oct. 11, 2016

(54) SMPS WITH ADAPTIVE COT CONTROL AND METHOD THEREOF

(71) Applicant: Monolithic Power Systems, Inc., San Jose, CA (US)

(72) Inventors: John Fogg, Cary, NC (US); Jian Jiang, Los Gatos, CA (US); Junyong Gong, Chengdu (CN)

(73) Assignee: MONOLITHIC POWER SYSTEMS, INC., San Jose, CA (US)

( * ) Notice: Subject to any disclaimer, the term of this patent is extended or adjusted under 35 U.S.C. 154(b) by 209 days.

(21) Appl. No.: 14/489,905

(22) Filed: Sep. 18, 2014

(65) Prior Publication Data

US 2016/0087528 A1    Mar. 24, 2016

(51) Int. Cl.
*H02M 3/156* (2006.01)
*H02M 1/00* (2006.01)

(52) U.S. Cl.
CPC ........... *H02M 3/156* (2013.01); *H02M 3/1563* (2013.01); *H02M 2001/0022* (2013.01)

(58) Field of Classification Search
CPC .......................... H02M 3/1563; H02M 3/156
See application file for complete search history.

(56) References Cited

U.S. PATENT DOCUMENTS

| | | | |
|---|---|---|---|
| 6,381,154 B1 * | 4/2002 | Nguyen | H02M 3/156 323/280 |
| 6,396,252 B1 * | 5/2002 | Culpepper | H02M 3/156 323/225 |
| 6,495,995 B2 * | 12/2002 | Groom | H02M 3/1584 323/283 |
| 2008/0042709 A1 * | 2/2008 | Chen | H02M 3/156 327/175 |
| 2010/0033215 A1 * | 2/2010 | Fogg | H03K 4/50 327/137 |
| 2010/0134080 A1 | 6/2010 | Ouyang | |
| 2010/0181983 A1 * | 7/2010 | Ouyang | H02M 3/156 323/283 |
| 2012/0146606 A1 * | 6/2012 | Li | H02M 3/156 323/283 |
| 2012/0235664 A1 | 9/2012 | Dong et al. | |
| 2013/0002221 A1 * | 1/2013 | Wang | H02M 3/158 323/283 |
| 2013/0002223 A1 | 1/2013 | Xi | |
| 2013/0257399 A1 | 10/2013 | Jiang et al. | |
| 2014/0035654 A1 | 2/2014 | Jiang et al. | |
| 2014/0125302 A1 | 5/2014 | Yang et al. | |
| 2014/0375286 A1 | 12/2014 | Jiang et al. | |

* cited by examiner

*Primary Examiner* — Timothy J Dole
*Assistant Examiner* — Ishrat Jamali

(57) ABSTRACT

A SMPS has a switching circuit and a controller. The switching circuit has an input terminal and an output terminal, and also includes a switch and an inductor, wherein the switching circuit regulates an output voltage at the output terminal based on an input voltage at the input terminal by controlling a switching action of the switch. The controller generates a switching control signal to control the switch, where the switching control signal transits from a first state to a second state when an output signal at the output terminal satisfies a predetermined condition, and the switching control signal transits from the second state to the first state after a period of time. And a switching frequency of the switch and an inductor ripple current of the inductor both vary with the input voltage.

15 Claims, 6 Drawing Sheets

SMPS WITH ADAPTIVE COT CONTROL AND METHOD THEREOF

TECHNICAL FIELD

The present invention generally relates to electrical circuits, and more particularly but not exclusively relates to SMPS with COT control.

BACKGROUND

A switching mode power supply (SMPS) is widely used for converting an input voltage into an output voltage by controlling the switching action of at least one switch. Constant ON time (COT) control is typically used for controlling a SMPS for its quick transient response. In a SMPS with COT control, a switch is turned on once a predetermined condition is detected, for example, when detecting that a feedback signal indicative of the output voltage drops below a reference signal. Then the switch is maintained in the ON state for a constant ON time. And at the end of the ON time, the switch is turned off.

When the ON time is fixed, it would cause large variation in switching frequency which varies with the variation in the input voltage and the output voltage of the SMPS. And large variation in switching frequency would introduce interference to the rest of the system. And also, the switching frequency is required to be limited in order to minimize the switching loss.

Accordingly, an improved COT SMPS is required to at least address one or some of the above deficiencies.

SUMMARY

In one embodiment, a SMPS comprising: a switching circuit having an input terminal and an output terminal, the switching circuit comprising a switch and an inductor, wherein the switching circuit regulating an output voltage at the output terminal based on an input voltage at the input terminal by controlling a switching action of the switch; and a controller configured to generate a switching control signal to control the switch, wherein the switching control signal transits from a first state to a second state when an output signal at the output terminal satisfies a predetermined condition, and the switching control signal transits from the second state to the first state after a period of time; wherein both a switching frequency of the switch and an inductor ripple current of the inductor are configured to vary with the input voltage and the output voltage.

In another embodiment, a controller for controlling a switch in a SMPS, the controller comprising: an output regulation circuit configured to generate an output regulation signal based on an output signal of the SMPS; an ON time control circuit configured to generate an ON time control signal based on an input voltage of the SMPS and an output voltage of the SMPS, the ON time control circuit comprising: a ramp signal generating circuit configured to generate a ramp signal having a slope determined by the input voltage and the output voltage; a reference signal generating circuit configured to generate a reference signal based on the output voltage; and a comparing circuit having a first input configured to receive the ramp signal, a second input configured to receive the reference signal and an output configured to provide the ON time control signal; and a logic circuit having a first input configured to receive the output regulation signal, a second input configured to receive the ON time control signal, and an output configured to provide a switching control signal for controlling a switching action of the switch.

In yet another embodiment, a method of controlling a SMPS comprising: regulating a switching frequency of the SMPS varying with an input voltage and an output voltage of the SMPS; regulating an inductor ripple current of the SMPS varying with the input voltage and the output voltage; and limiting the variation of the switching frequency and the variation of the inductor ripple current at the same time.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
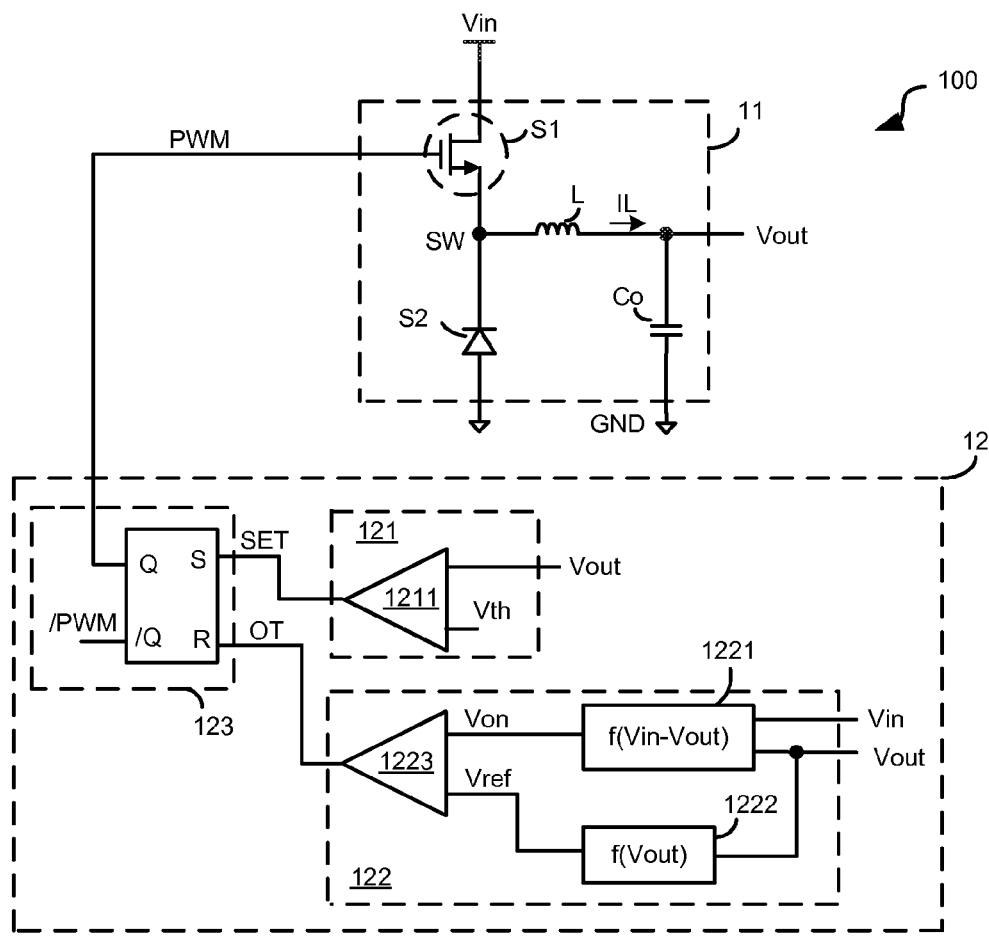
FIG. 1 illustrates a SMPS 100 according to an embodiment of the present invention.

FIG. 1 illustrates a SMPS 100 according to an embodiment of the present invention. SMPS 100 comprises a switching circuit 11 and a controller 12. Controller 12 generates at least one switching control signal for controlling at least one switch S1 in switching circuit 11, in order to regulate the output of SMPS 100 for supplying a load. As a SMPS with COT control, the generated switching control signal PWM transits from a first state to a second state when an output signal of switching circuit 11 satisfies a predetermined condition, such as when an output voltage of the switching circuit is lower than a reference, to make switch S1 transit into a first state, such as into ON state. And switching control signal PWM transits from the second state to the first state after a period of time, to make switch S1 transits into a second state, such as into OFF state. Where the period of time of the ON state of switch S1 is determined by the time point of when the control signal PWM transits from the second state to the first state. However, it should be known that a COT control according to embodiments of the present invention may refer to controlling an ON time period of a switch, or refer to controlling an OFF time period of a switch. Controller 12 controls that both a switching frequency of switch S1 and an inductor ripple current which is a peak to peak value of an inductor current IL, vary with the input voltage and also vary with the output voltage. Thus the two parameters are optimized in order to improve the characteristics of the SMPS in lower switching loss, higher system stability, smaller system volume, and so on.

Switching circuit 11 has an input terminal Vin and an output terminal Vout, and comprises the switch S1. Switching circuit 11 regulates an output voltage at output terminal Vout based on an input voltage at input terminal Vin by controlling the switching action of switch S1, or by controlling the switching actions of switch S1 and a synchronous rectifier. In one embodiment, switch S1 comprises a MOSFET. It is noted that the labels of "Vin" and "Vout" each may indicate either a terminal or a voltage signal. In another embodiment, switch S1 comprises a JFET. Switch S1 may yet comprise other types of switching element. In the shown embodiment, switching circuit 11 comprises a buck converter which comprises switch S1, a rectifier S2, and an output filter which comprises an output inductor L and an output capacitor Co. However, it should be known that the SMPS according to some embodiments of the present invention may have a different topology. And the switch as defined in the appended claims may refer to either a primary switch or a synchronous rectifier. Continuing with FIG. 1, switch S1 is coupled between input terminal Vin and a switching node SW. Rectifier S2 is coupled between switching node SW and a reference ground GND. In another embodiment, this non-synchronous diode S2 may be replaced by a synchronous rectifier and the synchronous rectifier comprises a switching element, such as MOSFET, JFET etc. Output inductor L is coupled between switching node SW and output terminal Vout. And output capacitor Co is coupled between output terminal Vout and reference ground GND. The input voltage is converted into a switching voltage at switching node SW under the switching action of switch S1. Then the switching voltage is filtered by output inductor L and output capacitor Co, into output voltage Vout which has a smoother waveform shape compared to the switching voltage at switching node SW. The output voltage at output terminal Vout is used to supply a load. To be specific, output voltage Vout is controlled by the input voltage and the duty cycle of switch S1, where the duty cycle indicates the proportion of the ON time of switch S1 (duration of the ON state of the switch S1) to one cycle period of switch S1.

Controller 12 generates a switching control signal PWM for controlling switch S1. Controller 12 comprises an output regulation circuit 121, an ON time control circuit 122 and a logic circuit 123. Output regulation circuit 121 generates an output regulation signal SET based on an output signal at output terminal Vout of SMPS 100. In one embodiment, output regulation circuit 121 comprises a comparing circuit 1211 having a first input, a second input and an output, wherein the first input is coupled to output terminal Vout configured to receive the output voltage or a feedback signal indicative of the output voltage. The second input of comparing circuit 1211 receives a reference threshold signal Vth. And the output of comparing circuit 1211 provides output regulation signal SET. In one embodiment, when output voltage Vout decreases and is lower than reference threshold signal Vth, output regulation signal SET transits in an effective state e.g. logic HIGH for turning on switch S1. In another embodiment, output regulation circuit 121 generates output regulation signal SET based on an output signal other than the output voltage, such as an inductor current sensing signal or an output power signal.

Continuing with FIG. 1, ON time control circuit 122 generates an ON time control signal OT based on input voltage Vin at the input terminal of SMPS 100 and output voltage Vout at the output terminal of SMPS 100. ON time control circuit 122 comprises a ramp signal generating circuit 1221, a reference signal generating circuit 1222 and a comparing circuit 1223. Ramp signal generating circuit 1221 generates a ramp signal Von based on input voltage Vin and output voltage Vout. In one embodiment, ramp signal Von is generated as a function of a voltage difference between input voltage Vin and output voltage Vout which may be indicated as: Von=f(Vin−Vout). However, it should be known that ramp signal Von can also be in a function as: Von=f((k1*Vin)−(k2*Vout)), where k1 and k2 are constant values (k1≠0, k2≠0) which not equal zero, and k1 and k2 are not equal but may have close values. In one embodiment, ramp signal Von is a saw tooth signal and the slope of ramp signal Von is controlled by the voltage difference between the input voltage and the output voltage (Vin−Vout). Reference signal generating circuit 1222 generates a reference signal Vref based on output voltage Vout. In one embodiment, reference signal is in a value indicated as: Vref=(a*Vout)−b, where a and b are constant values and a#0. Comparing circuit 1223 has a first input, a second input and an output, wherein the first input is coupled to the output of ramp signal generating circuit 1221 configured to receive ramp signal Von, the second input is coupled to the output of reference signal generating circuit 1222 configured to receive reference signal Vref, and the output provides ON time control signal OT.

Logic circuit 123 has a first input coupled to the output of output regulation circuit 121 to receive output regulation signal SET, a second input coupled to the output of ON time control circuit 122 to receive ON time control signal OT, and an output providing a switching control signal PWM for controlling the switching action of switch S1. In one embodiment as shown in FIG. 1, logic circuit 123 comprises an RS flip-latch which has a setting input S, a resetting input R, a first output Q and a second output /Q. Wherein setting input S is coupled to the output of output regulation circuit 121, resetting input R is coupled to the output of ON time control circuit 122, first output Q provides switching control signal PWM, and second output /Q provides a second control signal /PWM which is complementary to switching control signal PWM. In one embodiment, second control signal /PWM is supplied to ramp signal generating circuit 1221 of ON time control circuit 122 for generating ramp signal Von. In one embodiment, controller 12 further comprises a driving circuit which is coupled between the output of logic circuit 123 and switch S1 for driving switch S1 with an adequate voltage. In one embodiment, when output voltage Vout decreases and becomes lower than threshold voltage signal Vth, output regulation signal SET transits from an ineffective state to an effective state, and accordingly switching control signal PWM transits from an ineffective state to an effective state to turn on switch S1. At the meantime, ramp signal Von starts to increase. When ramp signal Von increases and reaches reference signal Vref, ON time control signal OT transits from an ineffective state to an effective state configured to trigger switching control signal PWM transiting to an ineffective state to turn off switch S1. And accordingly, ON time control signal OT determines the ON time of switch S1. In this embodiment, the ON time of switch S1 is determined by ramp signal Von and reference signal Vref, wherein ramp signal Von is determined by the voltage difference (Vin−Vout) between input voltage Vin and output voltage Vout, and reference signal Vref is determined by output voltage Vout. This configuration would leads to a trade-off between the switching frequency characteristic and the inductor ripple current characteristic, thus the switching loss is not high due to the limited switching frequency, and the inductor ripple current is also suppressed which makes the output capacitor compensation easy.

Figure 2:
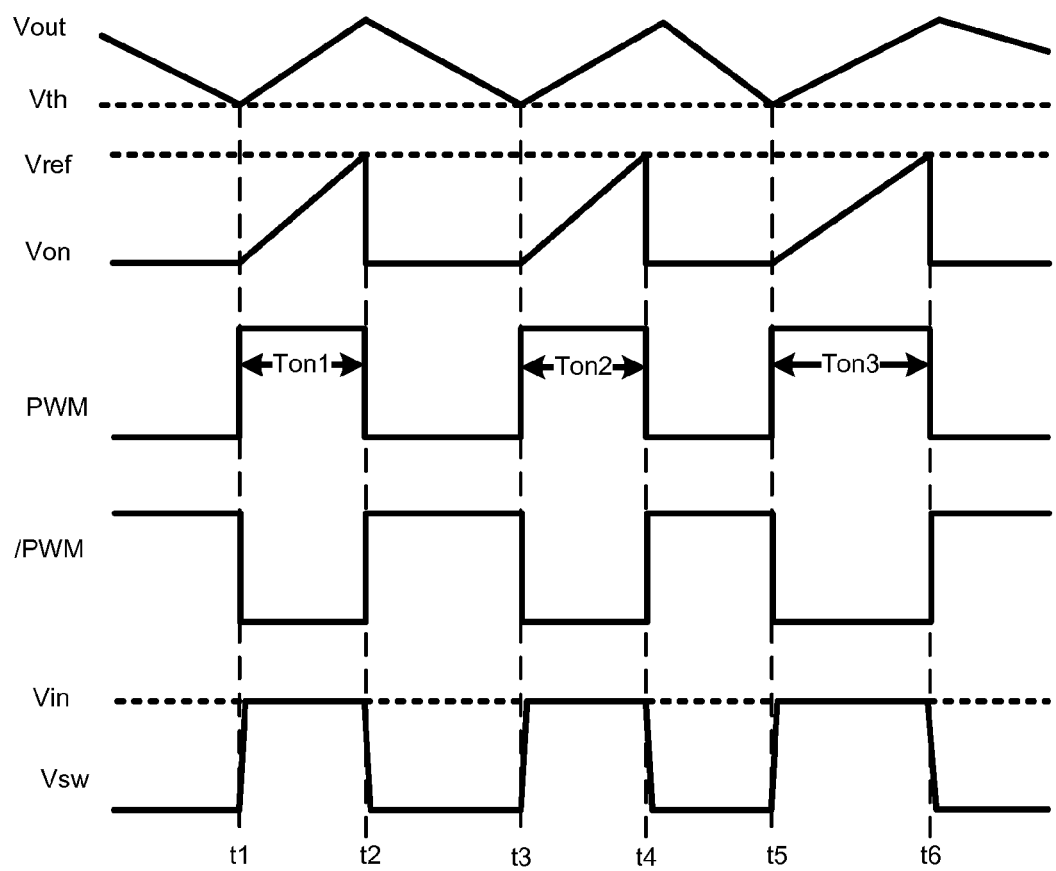
FIG. 2 shows a waveform diagram illustrating the signals in a SMPS 100 with reference to FIG. 1, according to an embodiment of the present invention.

FIG. 2 shows a waveform diagram for illustrating the signals in a SMPS 100 with reference to FIG. 1, according to an embodiment of the present invention. The signals include output voltage Vout, ramp signal Von, switching control signal PWM supplied to the control end of switch S1, the second control signal /PWM that is in complementary pattern with signal PWM, and a switching voltage Vsw at switching node SW. At time t1, output voltage Vout decreases and reaches a predetermined threshold voltage signal Vth, thus switching control signal PWM transits from an ineffective state (logic LOW here) to an effective state (logic HIGH here) to turn on switch S1. At the meantime, signal /PWM transits from logic HIGH to logic LOW. Switching voltage Vsw at switching node SW increases to approximate input voltage Vin due to the ON state of switch S1, and ramp signal Von increases from zero with a slope. At time t2, ramp signal Von reaches reference signal Vref, and switching control signal PWM is triggered from the effective state to the ineffective state for turning off switch S1. At the meantime, rectifier S2 is turned on for allowing current flowing through it, switching voltage Vsw decreases to approximate the reference ground voltage, output voltage Vout starts decreasing gradually and ramp signal Von decreases to zero swiftly. Accordingly, ON time Toni of switch S1 is determined as a time period from time t1 to time t2. And ON time of switch S1 is determined by the slope of ramp signal Von between time t1 and time t2. Wherein the slope of ramp signal Von is further determined by input voltage Vin and output voltage Vout. In one embodiment, the slope of ramp signal Von is a function of f(Vin−Vout) as described above. And at time t3, the output voltage decreases to reach threshold voltage signal Vth and starts another cycle.

Figure 3:
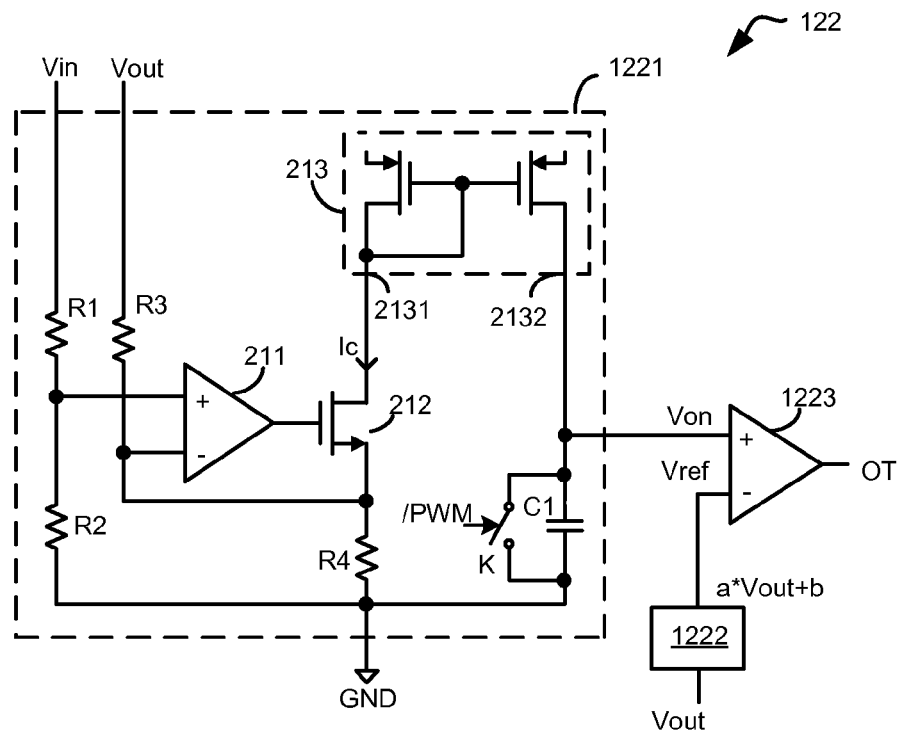
FIG. 3 illustrates an ON time control circuit 122 for generating an ON time control signal OT according to an embodiment of the present invention.

FIG. 3 illustrates an ON time control circuit 122 for generating an ON time control signal OT according to an embodiment of the present invention. ON time control circuit 122 comprises a ramp signal generating circuit 1221, a reference signal generating circuit 1222 and a comparing circuit 1223. Ramp signal generating circuit 1221 comprises a current signal generating circuit which generates a current signal Ic as a function of the voltage difference between input voltage Vin and output voltage Vout, and a capacitor C1 that is charged by current signal Ic when a primary switch S1 is in ON state. And the voltage across capacitor C1 forms ramp signal Von whose slope is a function of the voltage difference between input voltage Vin and output voltage Vout. In one embodiment, current signal Ic is proportional to the voltage difference (Vin−Vout) between input voltage Vin and output voltage Vout, and the slope of ramp signal Von is also proportional to the voltage difference Vin−Vout. When ramp signal Von increases and reaches a reference signal Vref generated by reference signal generating circuit 1222, an ON time control signal OT transits from an ineffective state to an effective state to turn off switch S1, and capacitor C1 is discharged to ground level simultaneously. The current signal generating circuit of ramp signal generating circuit 1221 comprises a resistor divider which comprises a first resistor R1 and a second resistor R2, a third resistor R3, a fourth resistor R4, an amplifier 211, a transistor 212 and a current mirror 213. The first resistor R1 has a first end coupled to input terminal Vin for receiving the input voltage, and has a second end coupled to a first input (+) of amplifier 211. The second resistor R2 has a first end coupled to the second end of the first resistor R1, and has a second end coupled to a reference ground GND. The third resistor R3 has a first end coupled to output terminal Vout for receiving the output voltage, and has a second end coupled to a second input of amplifier 211. The fourth resistor R4 has a first end coupled to a second input (−) of amplifier 211, and has a second end coupled to reference ground GND. In one embodiment, the first input of amplifier 211 is a non-inverting input, and the second input of amplifier 211 is an inverting input. As indicated above, the first input of amplifier 211 is coupled to the second end of the first resistor R1 which is also the output of the resistor divider, and the second input of amplifier 211 is coupled to the second end of third resistor R3 and the first end of the fourth resistor R4. Transistor 212 has a first end, a second end and a control end. Wherein the first end of transistor 212 is coupled to the first end of the fourth resistor R4, the second end of transistor 212 provides a current signal Ic and the control end of transistor 212 is coupled to an output of amplifier 211. Thus current Ic flowing through transistor 212 is controlled by the output of amplifier 211. Transistor 212 may comprise a metal oxide semiconductor field effect transistor (MOSFET), a junction field effect transistor (JFET), or other type of transistor.

As intrinsic characteristics of an operational amplifier, the currents at the two inputs of amplifier 211 approximate zero and the voltages at the two inputs are substantially the same. Accordingly the voltage V+ at the non-inverting input of amplifier 211 is proportional to input voltage Vin, which may be indicated as:

$$V^+ = \frac{R2}{R1+R2} * Vin$$

The current flowing through R3 is:

$$I3 = \frac{Vout - V^+}{R3} = \frac{Vout - \frac{R2}{R1+R2} * Vin}{R3}$$

And the current flowing through R4 is:

$$I4 = \frac{V^+}{R4} = \frac{R2}{R4*(R1+R2)}*Vin$$

Thus the current flowing through transistor 212 is:

$$Ic = I4 - I3 = \frac{R2}{R4*(R1+R2)}*Vin - \frac{Vout - \frac{R2}{R1+R2}*Vin}{R3}$$

In one embodiment, the resistances for the first resistor R1 and the third resistor R3 are selected to be the same (R1=R3), and the resistances for the second resistor R2 and the fourth resistor R4 are selected to be the same (R2=R4), and current Ic is:

$$Ic = \frac{Vin - Vout}{R1},$$

which is proportional to the voltage difference between input voltage Vin and output voltage Vout.

In one embodiment, the voltage supplied to the non-inverting input of amplifier 211 is proportional to input voltage Vin as K*Vin (where k is a constant), and the resistance of the third resistor R3 is selected to be $$R3 = \frac{1-k}{k}*R4, \text{ or } R3 = \frac{R1}{R2}*R4 \left(\text{since } k = \frac{R2}{R1+R2}\right),$$

and accordingly current Ic for charging capacitor C1 is:

$$Ic = \frac{k*(Vin-Vout)}{(1-k)*R4} = \frac{R2*(Vin-Vout)}{R1*R4}.$$

Thus the slope of ramp signal Von is proportional to current signal Ic, and is thus proportional to the voltage difference (Vin−Vout) between input voltage Vin and output voltage Vout.

Current mirror 213 comprises two transistors having the gates and sources coupled together, thus the current flowing through input 2131 of current mirror 213 which is at the drain of a first transistor is proportional to the current flowing at output 2132 of current mirror 213. Accordingly, current Ic flowing through transistor 212 at input 2131 of current mirror 213 is proportional to the current at output 2132 of current mirror 213 which is coupled to capacitor C1 for charging capacitor C1. Capacitor C1 has a first end coupled to output 2132 of current mirror 213, and has a second end coupled to reference ground GND. Ramp signal generating circuit 1221 further comprises a switch K which has a first end coupled to the first end of capacitor C1, has a second end coupled to the second end of capacitor C1, and has an control end receiving a second control signal /PWM which is in complementary pattern with a switching control signal PWM which is used for controlling the primary switch of a switching circuit. The first end of capacitor C1 forms the output of ramp signal generating circuit 1221. When the primary switch of the controlled switching circuit is in OFF state, control signal /PWM is in an effective state, and switch K is in ON state and current Ic flows through switch K directly to the reference ground, and ramp signal Von is at ground voltage. And when the primary switch of the switching circuit is in ON state, the control signal /PWM is in an ineffective state, switch K is in OFF state, and current Ic charges capacitor C1.

Reference signal generating circuit 1222 is coupled to the output terminal for receiving output voltage Vout, and provides a reference signal Vref at its output. Reference signal Vref has a value of:

$$Vref = a*Vout - b$$

where a and b indicate constant values.

Comparing circuit 1223 has a first input (+), a second input (−), and an output, wherein the first input is coupled to the output of ramp signal generating circuit 1221 to receive ramp signal Von, the second input of comparing circuit 1223 is coupled to the output of reference signal generating circuit 1222 to receive reference signal Vref, and the output of comparing circuit 1223 provides ON time control signal OT.

When switching control signal PWM is in effective state, the second control signal /PWM is in ineffective state, switch K is in OFF state, and current Ic charges capacitor C1. Ramp signal Von increases. When ramp signal Von surpasses reference signal Vref, ON time control signal OT transits from ineffective state to effective state, and switching control signal PWM transits from effective state to ineffective state for turning off the primary switch of the switching circuit. At the meantime, the second control signal /PWM transits from ineffective state to effective state and switch K is turned on, and ramp signal Von decreases to ground voltage level. Ramp signal Von maintains at zero until the switching control signal transits to its effective state, then switch K is turned off again and another cycle begins.

When the slope of ramp signal Von is high, the ON time of the primary switch is short, and the switching frequency is high. Since current Ic used for charging capacitor C1 is a function of Ic=f(Vin−Vout), when input voltage Vin increases, the slope of ramp signal Von increases, the ON time period of the primary switch S1 becomes shorter, and the switching frequency increases. Output voltage Vout would increase with input voltage Vin accordingly, then the slope of ramp signal Von would decrease, and reference signal Vref increases. Accordingly, the rising rate of the switching frequency would decrease.

The switching frequency may be determined as:

$$Fsw = \frac{Duty}{Ton} = \frac{Vout/Vin}{Vref/Ic*\frac{1}{C}} = \frac{Vout*(Vin-Vout)}{Vin*R*C*Vref},$$

where R indicates the resistance for resistors R1, R2, R3 and R4, and C indicates the capacitance for capacitor C1. Accordingly, reference signal Vref may be calculated from the required range of switching frequency Fsw in view of the possible ranges of input voltage Vin and output voltage Vout, and also the values of R and C.

Figure 4:
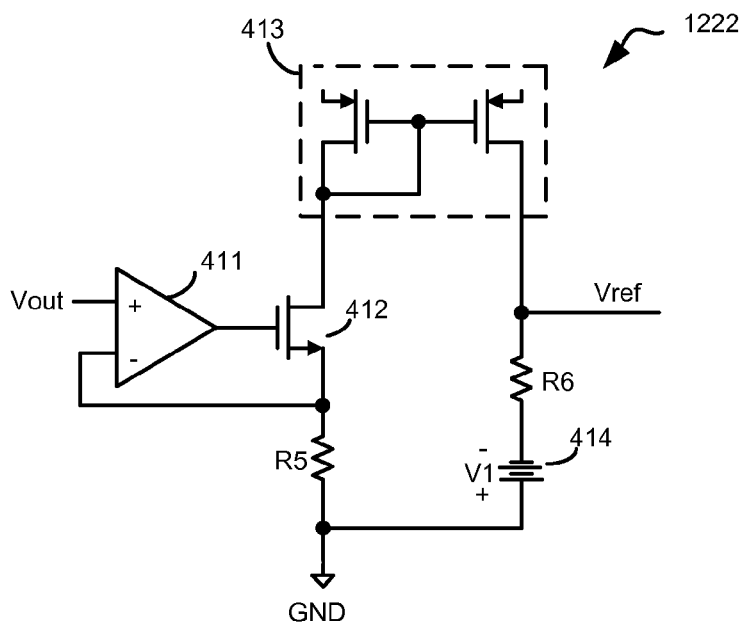
FIG. 4 illustrates a reference signal generating circuit 1222 according to an embodiment of the present invention.

FIG. 4 illustrates a reference signal generating circuit 1222 according to an embodiment of the present invention. Reference signal generating circuit 1222 comprises an amplifier 411, a first resistor R5, a transistor 412, a current mirror 413, a second resistor R6 and a voltage source 414. Amplifier 411 has a first input, a second input and an output, wherein the first input is coupled to the output terminal for receiving output voltage Vout. The first resistor R5 has a first end and a second end, wherein the first end is coupled to the second input of amplifier 411, and the second end of transistor R5 is coupled to reference ground GND. Transistor 412 has a first end, a second end and a control end, wherein the first end is coupled to the first end of resistor R5, the control end is coupled to the output of amplifier 411. Current mirror 413 has an input and an output, wherein the input of current mirror 413 is coupled to the second end of transistor 412. The second resistor R6 has a first end coupled to the output of current mirror 413 and has a second end coupled to a negative terminal of a voltage source 414 which provides a voltage V1. Accordingly, the current flowing through transistor 412 has a value of $$\frac{Vout}{R5},$$

and reference signal Vref is:

$$Vref = a*Vout - b = \frac{R6}{R5} * Vout - V1,$$

where $$a = \frac{R6}{R5},$$

and b=V1. As illustrated above, reference signal Vref may be determined by calculating from the desired switching frequency range. In one embodiment, the value of $$\frac{R6}{R5}$$

is selected from the range of 0.5 to 0.7, and the value of V1 is between the range of 0.15 volts to 0.35 volts. And in a particular embodiment, $$\frac{R6}{R5}$$

is about 0.6 and V1 is about 0.3 volts.

Figure 5:
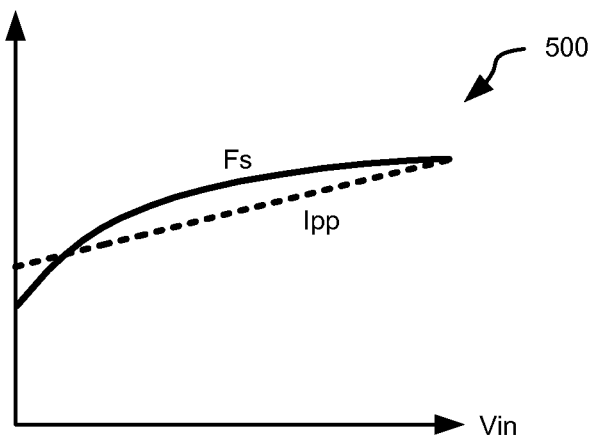
FIG. 5 shows a waveform diagram to illustrate the function of the switching frequency and the inductor ripple current based on the variation of the input voltage according to an embodiment of the present invention.

FIG. 5 shows a waveform diagram to illustrate the function of the switching frequency and the inductor ripple current based on the variation of the input voltage according to an embodiment of the present invention. From this figure, it can be seen that both the switching frequency Fs and the peak to peak inductor ripple current Ipp increases with the input voltage gradually and moderately. The characteristics and advantages of the embodiments of the present invention will be illustrated in comparison with two other possible control methods.

Figure 6:
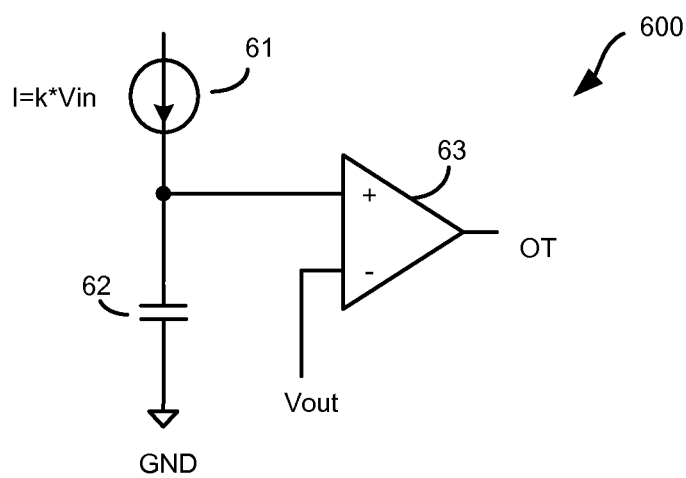
FIG. 6 illustrates an ON time control signal generating circuit 600 according to a prior art control method.
Figure 7:
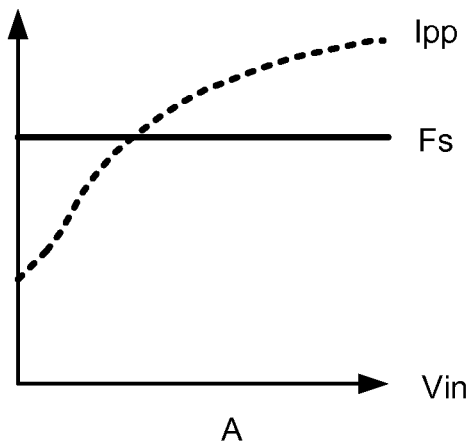
FIG. 7 shows a waveform diagram to illustrate the function of the switching frequency and the inductor ripple current based on the input voltage Vin for the prior control method associated with the circuit 600 in FIG. 6.

FIG. 6 illustrates an ON time control signal generating circuit 600 of a first control method as a prior art. ON time control signal generating circuit 600 comprises a current source 61, a capacitor 62 and a comparator 63. Current source 61 is proportional to input voltage Vin as: I=K*Vin and charges capacitor 62. A first input of comparator 63 is coupled to a common end of current source 61 and capacitor 62, and a second input of comparator 63 is coupled to an output terminal of the switching circuit for receiving output voltage Vout or a feedback signal indicating output voltage Vout. ON time control signal OT is generated by comparing the voltage across capacitor 62 and output voltage Vout. FIG. 7 shows a waveform diagram to illustrate the function of switching frequency Fs and inductor ripple current Ipp based on input voltage Vin for the first control method associated with circuit 600 in FIG. 6. With this control method, the cycle period $$T = \frac{Ton}{Duty} = \frac{Ton}{Vout} * Vin = \frac{C}{K},$$

where C is the capacitance of capacitor 62. Thus switching frequency Fs is constant. However, inductor ripple current Ipp flowing through inductor L as shown in FIG. 1 increases with input voltage Vin fast and has a large variation. This is because this control method has a fixed cycle period, the output voltage is regulated only by varying the duty cycle and thus leads to wide duty cycle variation. And the wide duty cycle variation would result in large variation in inductor ripple current Ipp. In practical applications, inductor ripple current Ipp is designed as a trade-off between transient response, power dissipation due to high ripple current, and maximum current requirements of the power handling components in the SMPS. Thus it is required that the inductor ripple current is neither too low nor too high. Furthermore, the large variation of inductor ripple current makes compensation difficult for ceramic output capacitors and brings forth challenge to the selection of output capacitor Co with a fixed inductor L. However, in a module product, inductor L is usually fixed which would introduce variation in inductor ripple current with the input voltage and the output voltage. Thus for the method shown in FIG. 6, the system is unstable and the variation of the inductor current ripple needs be limited.

Figure 8:
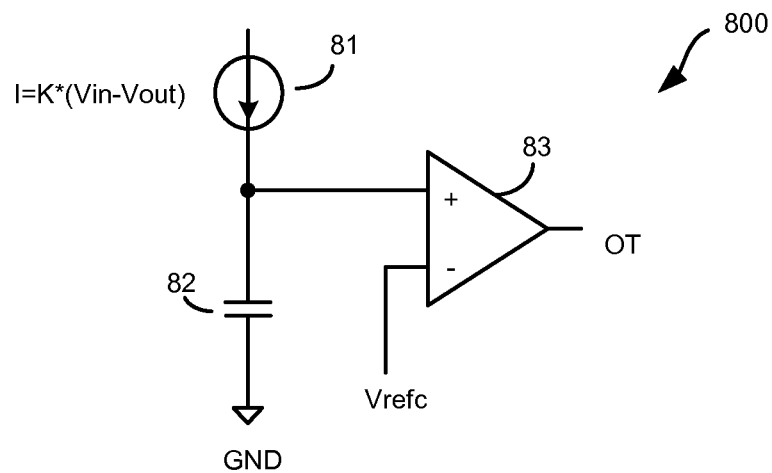
FIG. 8 illustrates an ON time control signal generating circuit 800 according to an embodiment of the present invention.
Figure 9:
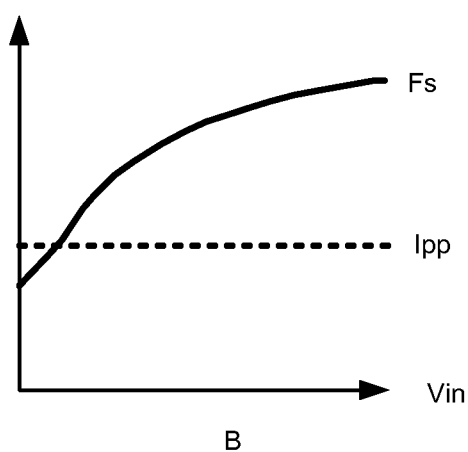
FIG. 9 illustrates the function of the switching frequency Fs and the inductor ripple current Ipp based on the input voltage Vin for the second control method associated with the circuit 800 in FIG. 8.

FIG. 8 illustrates an ON time control signal generating circuit 800 of a second control method according to an embodiment of the present invention which can overcome the deficiencies provided by the first control method associated with circuit 600 in FIG. 6. Where current source 81 of circuit 800 is proportional to a difference (Vin−Vout) between input voltage Vin and output voltage Vout, and a second input of comparator 63 receives a constant reference signal Vrefc. FIG. 9 illustrates the function of switching frequency Fs and inductor ripple current Ipp based on input voltage Vin for the second control method associated with circuit 800 in FIG. 8. With this control method, the inductor ripple current is constant which is easily to be compensated and is good for output capacitor design. However, switching frequency Fs increases fast and switching frequency Fs under normal input voltage range is either too high which may cause high switching loss when the input voltage is high, or switching frequency Fs is too low which may cause magnetic interference when the input voltage is low. And a further drawback is that since the duty cycle is fixed, the output voltage is not adjustable.

In comparison with the two control methods associated with the circuits 600 and 800 in FIGS. 6 and 8, the ON time control method according to some embodiments of the present invention associated with FIGS. 3-5 could achieve a trade-off between the switching frequency and the inductor ripple current by controlling the switching frequency and the inductor ripple current both vary with the input voltage and the output voltage, thus both the switching frequency and the inductor ripple current are not too high, nor too low when working in normal input voltage range. Meanwhile, the output voltage is adjustable. The variable reference signal according to embodiments of the present invention increases the minimum switching frequency, and decreases the maximum frequency to keep it within a defined range based on the on-time calculation. The switching frequency may be determined as $$Fsw = \frac{Vout*(Vin-Vout)}{Vin*R*C*Vref},$$

where R is the resistance of resistor R4, C is the capacitance of C1, and the reference signal may be represented as: Vref=a*Vout−b (a and b are constant values). In one embodiment, reference signal Vref is about:

Vref=1.2+0.6*(Vout−2.4), where a=0.6 and b=0.24 volts. And in one embodiment, the switching frequency during normal operation is kept above 2 Mhz to reduce interference and below 4 Mhz to reduce power dissipation. And the variation of inductor ripple current Ipp according to some embodiments of the present invention associated with FIGS. 3-5 is not high which would make the selection of the output capacitor easy. Accordingly, the circuits according to embodiments of the present invention optimize the on-time based on the input voltage and the output voltage and significantly improve the performance of the module products with a fixed inductor and adjustable output voltage, and result in a trade-off between the switching frequency Fs and the inductor ripple current Ipp. And at the meantime, a smaller inductor may be used, and the size of the inductor can be reduced.

Figure 10:
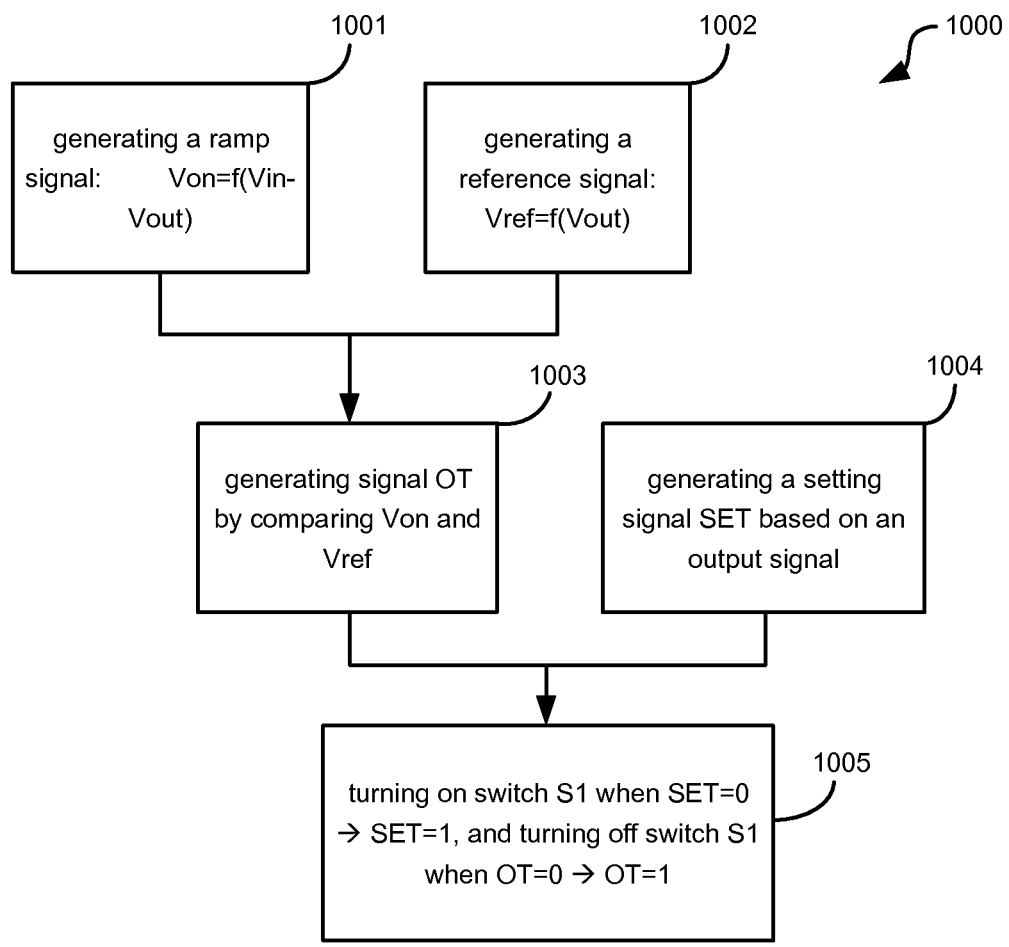
FIG. 10 shows a flow chart diagram illustrating a method 1000 of controlling a switch in a SMPS according to an embodiment of the present invention.

FIG. 10 shows a flow chart diagram illustrating a method 1000 of controlling a switch in a switching circuit according to an embodiment of the present invention. In general, the method adopts a COT control, and comprises regulating a switching frequency of the switching circuit varying with an input voltage and also with an output voltage of the switching circuit, regulating an inductor ripple current of the switching circuit varying with the input voltage and the output voltage, and limiting the variation of the switching frequency and the variation of the inductor ripple current at the same time as described above with reference to FIG. 5. Accordingly, the variation of the switching frequency is not too high and minimizes the interference to the rest of the SMPS; the switching frequency is not too high and minimizes the switching loss; the inductor current ripple is not too high, and the system stability is improved; and the inductor current is limited so as to suppress the power dissipation.

In a specific embodiment, method 1000 comprising at block 1001 generating a ramp signal Von as a function of the voltage difference between the input voltage Vin of the switching circuit and the output voltage Vout of the switching circuit, which can be indicated as Von=f(Vin−Vout). In one embodiment, the ramp signal Von is proportional to the voltage difference (Vin−Vout). In one embodiment, generating the ramp signal comprises: generating a current signal that is proportional to the voltage difference between the input voltage and the output voltage (vin−Vout); and getting a ramp signal by charging a capacitor by the current signal when the switch is in ON state. The method 1000 comprises at block 1002 generating a reference signal Vref as a function of the output voltage Vout, which can be indicated as Vref=f(Vout). In one embodiment, the reference signal equals: Vref=(a*Vout)−b, where a and b are constant positive values. In one embodiment, generating the reference signal Vref comprises calculating the reference signal from the required switching frequency Fsw range according to an equation:

$$Fsw = \frac{Vout*(Vin-Vout)}{Vin*R*C*Vref},$$

where R and C are predetermined values. The method 1000 comprises at block 1003 generating an on time control signal OT by comparing the ramp signal Von and the reference signal Vref. The method 1000 comprises at block 1004 generating an output regulation signal SET based on an output signal of the switching circuit. In one embodiment, the output signal is the output voltage Vout. Then turning to block 1005, when the output voltage Vout is lower than a reference threshold signal, output regulation signal SET transit from an ineffective state "O0" to an effective state "1", and switch S1 of the switching circuit is turned on. And at the meantime, the ramp signal increases from zero. When the ramp signal Von increases to be above the reference signal Vref, the on time control signal OT transits to effective state (OT=1) and the switch S1 of the switching circuit is turned off.

In some of the above embodiments, an "effective state" is in a logic "HIGH" state which corresponds to a high voltage level, and an "ineffective state" is in a logic "LOW" state which corresponds to a low voltage level. However, in other embodiments, an "effective state" may be in a low voltage level, and an "ineffective state" is in a high voltage level.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A Switching Mode Power Supply (SMPS), comprising:
a switching circuit having an input terminal and an output terminal, the switching circuit comprising a switch and an inductor, wherein the switching circuit regulates an output voltage at the output terminal based on an input voltage at the input terminal by controlling a switching action of the switch; and
a controller configured to generate a switching control signal to control the switch, wherein the switching control signal transits from a first state to a second state when an output signal at the output terminal satisfies a predetermined condition, and the switching control signal transits from the second state to the first state after a period of time; wherein a switching frequency of the switch and an inductor ripple current of the inductor are both configured to vary with the input voltage;
wherein the controller comprises:
an output regulation circuit configured to generate an output regulation signal based on the output signal;
an ON time control circuit configured to generate an ON time control signal, the ON time control circuit comprising:
a ramp signal generating circuit configured to generate a ramp signal based on the input voltage and the output voltage;

a reference signal generating circuit configured to generate a reference signal based on the output voltage; and a comparing circuit having a first input configured to receive the ramp signal, a second input configured to receive the reference signal, and an output configured to provide the ON time control signal based on the comparison between the ramp signal and the reference signal; and a logic circuit having a first input configured to receive the output regulation signal, a second input configured to receive the ON time control signal, and an output configured to provide the switching control signal;

wherein the ramp signal generating circuit comprises:

a current generating circuit configured to generate a current signal that is proportional to the voltage difference between the input voltage and the output voltage; and a capacitor charged by the current signal when the switch is in an ON state, and wherein the voltage across the capacitor forms the ramp signal.

2. The SMPS of claim 1, wherein the current signal generating circuit comprises:

a first resistor having a first end and a second end, wherein the first end of the first resistor is coupled to the input terminal;

a second resistor having a first end and a second end, wherein the first end of the second resistor is coupled to the second end of the first resistor, and the second end of the second resistor is coupled to a reference ground;

a third resistor having a first end and a second end, wherein the first end of the third resistor is coupled to the output terminal;

an amplifier having a first input, a second input and an output, wherein the first input of the amplifier is coupled to the second end of the first resistor and the first end of the second resistor, the second input of the amplifier is coupled to the second end of the third resistor;

a fourth resistor having a first end and a second end, wherein the first end of the fourth resistor is coupled to the second input of the amplifier and the second end of the fourth resistor is coupled to the reference ground; and a transistor having a first end, a second end and a control end, wherein the first end of the transistor is coupled to the first end of the fourth resistor, the control end of the transistor is coupled to the output of the amplifier, and the second end of the transistor is configured to provide the current signal.

3. The SMPS of claim 1, wherein the reference signal Vref is indicated as: Vref=(a*Vout)−b, where a and b indicate respective constant values, and Vout indicates the output voltage.

4. The SMPS of claim 3, wherein the constant value a is selected from the range of 0.5 to 0.7, and the constant value b is selected from the range of 0.15 Volts to 0.35 Volts.

5. The SMPS of claim 1, wherein the output regulation circuit comprises a comparing circuit, the comparing circuit having a first input, a second input and an output, wherein the first input of the comparing circuit is coupled to the output terminal configured to receive the output voltage or a feedback signal indicative of the output voltage, the second input of the comparing circuit is configured to receive a reference threshold signal, and the output of the comparing circuit is configured to provide the output regulation signal, wherein the switching control signal transits from the first state to the second state when the output voltage or the feedback signal is lower than the reference threshold signal.

6. The SMPS according to claim 1, wherein the switching circuit comprises a buck converter.

7. The SMPS according to claim 1, wherein the logic circuit comprises an IRS flip-latch, wherein the first input of the logic circuit comprises a setting input of the RS flip-latch, the second input of the logic circuit comprises a resetting input of the RS flip-latch, and an output of the RS flip-latch is configured to provide the switching control signal.

8. A controller for controlling a switch in a SMPS, the controller comprising:

an output regulation circuit configured to generate an output regulation signal based on an output signal of the SM PS;

an ON time control circuit configured to generate an ON time control signal, the ON time control circuit comprising:

a ramp signal generating circuit configured to generate a ramp signal having a slope determined by an input voltage of the SMPS and an output voltage of the SM PS;

a reference signal generating circuit configured to generate a reference signal based on the output voltage; and a comparing circuit having a first input configured to receive the ramp signal, a second input configured to receive the reference signal and an output configured to provide the ON time control signal; and a logic circuit having a first input configured to receive the output regulation signal, a second input configured to receive the ON time control signal, and an output configured to provide a switching control signal for controlling a switching action of the switch;

wherein the ramp signal generating circuit comprises:

a current generating circuit configured to generate a current signal that is proportional to the voltage difference between the input voltage and the output voltage;

a current mirror having an input and an output, wherein the input of the current mirror is coupled to the output of the current generating circuit;

a capacitor coupled between the output of the current mirror and a reference ground; and a second switch coupled across the capacitor, and a control end of the second switch is coupled to a second control signal which is in complementary pattern with the switching control signal, wherein the voltage across the capacitor forms the ramp signal.

9. The controller of claim 8, wherein the current signal generating circuit comprises:

a first resistor having a first end and a second end, wherein the first end of the first resistor is coupled to the input terminal;

a second resistor having a first end and a second end, wherein the first end of the second resistor is coupled to the second end of the first resistor, and the second end of the second resistor is coupled to a reference ground;

a third resistor having a first end and a second end, wherein the first end of the third resistor is coupled to the output terminal;

an amplifier having a first input, a second input and an output, wherein the first input of the amplifier is coupled to the second end of the first resistor and the first end of the second resistor, and the second input of the amplifier is coupled to the second end of the third resistor;

a fourth resistor having a first end and a second end, wherein the first end of the fourth resistor is coupled to the second input of the amplifier and the second end of the fourth resistor is coupled to the reference ground; and a transistor having a first end, a second end and a control end, wherein the first end of the transistor is coupled to the first end of the fourth resistor, the control end of the transistor is coupled to the output of the amplifier, and the second end of the transistor is configured to provide the current signal.

10. The controller of claim 9, wherein the resistance of the first resistor is substantially the same with the resistance of the third resistor, and the resistance of the second resistor is substantially the same with the resistance of the fourth resistor.

11. The controller of claim 8, wherein the reference signal Vref is indicated as:

Vref=(a*Vout)−b, where a and b indicate respective constant values, and Vout indicates the output voltage.

12. The controller of claim 8, wherein:

the output regulation circuit comprises a comparing circuit, the comparing circuit having a first input, a second input and an output, wherein the first input of the comparing circuit is coupled to the output terminal configured to receive the output voltage or a feedback signal indicative of the output voltage, the second input of the comparing circuit is configured to receive a reference
threshold signal, and the output of the comparing circuit is configured to provide the output regulation signal; and the logic circuit comprises an RS flip-latch, wherein the first input of the logic circuit comprises a setting input of the RS flip-latch, the second input of the logic circuit comprises a resetting input of the RS flip-latch, and an output of the RS flip-latch is configured to provide the switching control signal.

13. A method of controlling a SMPS with COT control, the SMPS comprising a switch and an inductor, the method comprising:

regulating a switching frequency of the switch varying with an input voltage;

regulating an inductor ripple current of the inductor varying with the input voltage;

limiting the variation of the switching frequency and the variation of the inductor ripple current at the same time, generating a ramp signal based on a voltage difference between the input voltage and an output voltage of the SMPS;

generating a reference signal based on the output voltage;

turning on the switch when the output voltage is lower than a reference threshold signal; and turning off the switch when the ramp signal is higher than the reference signal;

wherein generating the ramp signal comprises:

generating a current signal that is proportional to the voltage difference between the input voltage and the output voltage; and obtaining the ramp signal by charging a capacitor when the switch is in an ON state.

14. The method of claim 13, wherein the reference signal Vref is Vref=(a*Vout)−b, where a and b indicate respective constant values, and Vout indicates the output voltage.

15. The method of claim 13, wherein generating the reference signal comprises calculating the reference signal from a required switching frequency of the SMPS.

* * * * *